United States Patent
Chupeau et al.

(10) Patent No.: US 12,464,110 B2
(45) Date of Patent: Nov. 4, 2025

(54) METHOD AND APPARATUSES FOR DELIVERING A VOLUMETRIC VIDEO CONTENT

(71) Applicant: InterDigital VC Holdings, Inc., Wilmington, DE (US)

(72) Inventors: Bertrand Chupeau, Rennes (FR); Gerard Briand, Ploufragan (FR); Thierry Tapie, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 458 days.

(21) Appl. No.: 17/642,075

(22) PCT Filed: Sep. 2, 2020

(86) PCT No.: PCT/US2020/049022
§ 371 (c)(1),
(2) Date: Mar. 10, 2022

(87) PCT Pub. No.: WO2021/050336
PCT Pub. Date: Mar. 18, 2021

(65) Prior Publication Data
US 2023/0217006 A1 Jul. 6, 2023

(30) Foreign Application Priority Data
Sep. 10, 2019 (EP) .................................... 19306090

(51) Int. Cl.
*G06T 7/11* (2017.01)
*G06T 17/00* (2006.01)
(Continued)

(52) U.S. Cl.
CPC ............. *H04N 13/388* (2018.05); *G06T 7/11* (2017.01); *G06T 17/00* (2013.01); *H04N 13/178* (2018.05); *H04N 19/597* (2014.11)

(58) Field of Classification Search
CPC .. H04N 13/388; H04N 13/178; H04N 19/597; H04N 13/117; H04N 13/194;
(Continued)

(56) References Cited

U.S. PATENT DOCUMENTS

2010/0226593 A1* 9/2010 Gerhard ................ G06F 3/0481
715/815
2011/0148894 A1* 6/2011 Duprat .................. G06T 11/001
345/552

(Continued)

FOREIGN PATENT DOCUMENTS

CN 104981839 A 10/2015
CN 109792563 A 5/2019
(Continued)

OTHER PUBLICATIONS

CN 104981839 (A), US 2015/0363905 (A1).
(Continued)

*Primary Examiner* — Phi Hoang
(74) *Attorney, Agent, or Firm* — Condo Roccia Koptiw LLP

(57) ABSTRACT

Methods, apparatuses and streams are disclosed for transmitting tiled volumetric video and, at the receiver, for generating an atlas image compatible with a legacy decoder. At the server side, viewport information is obtained and a first list of central tiles and a second list of border tiles are selected. A central tile is a part of an image obtained by projecting the 3D scene onto an image plane according to a central point of view. A border tile is an image comprising dis-occluding patches. Sizes and shapes of border tiles are function of size and shape of central tiles. At the client side, tiles are arranged according to a layout selected in a set of layouts according to the number, sizes and shapes of border tiles.

13 Claims, 5 Drawing Sheets

(51) Int. Cl.
*H04N 13/178* (2018.01)
*H04N 13/388* (2018.01)
*H04N 19/597* (2014.01)

(58) Field of Classification Search
CPC ...... H04N 13/161; H04N 19/176; G06T 7/11; G06T 17/00
See application file for complete search history.

(56) References Cited

U.S. PATENT DOCUMENTS

| | | | |
|---|---|---|---|
| 2015/0109342 A1* | 4/2015 | Ohki | G06T 3/40 345/660 |
| 2015/0363905 A1 | 12/2015 | Pepperell et al. | |
| 2017/0251180 A1 | 8/2017 | Smolyanskiy et al. | |
| 2017/0339440 A1 | 11/2017 | Galpin et al. | |
| 2018/0035134 A1* | 2/2018 | Pang | H04N 13/117 |
| 2018/0152688 A1 | 5/2018 | Graziosi et al. | |
| 2018/0160123 A1 | 6/2018 | Van Der Auwera et al. | |
| 2018/0199029 A1 | 7/2018 | Van Der Auwera et al. | |
| 2019/0238861 A1 | 8/2019 | D'acunto et al. | |
| 2019/0304097 A1* | 10/2019 | Eade | G06F 16/29 |
| 2019/0371051 A1 | 12/2019 | Dore et al. | |
| 2019/0387212 A1 | 12/2019 | Oh | |
| 2020/0294271 A1* | 9/2020 | Ilola | G06T 17/20 |

FOREIGN PATENT DOCUMENTS

| | | |
|---|---|---|
| CN | 110168600 A | 8/2019 |
| EP | 3 322 186 A1 | 5/2018 |
| EP | 3496388 A1 | 6/2019 |
| IN | 201714015763 A | 12/2017 |
| KR | 20190068622 A | 6/2019 |
| KR | 20190091275 A | 8/2019 |
| KR | 20190095430 A | 8/2019 |
| KR | 20190105011 A | 9/2019 |
| WO | 2019/055389 A1 | 3/2019 |
| WO | 2019/079032 A1 | 4/2019 |

OTHER PUBLICATIONS

CN 109792563 (A), US 2019/0238861 (A1).
CN 110168600 (A), US 2018/0199029 (A1).
Xie et al., "Viewport Adaptation-Based Immersive Video Streaming: Perceptual Modeling and Applications", Cornet University Library, arXiv: 1802.06057, Feb. 16, 2018, pp. 1-12.
Misra et al., "An Overview of Tiles in HEVC", Institute for Electrical and Electronics Engineers (IEEE), IEEE Journal of Selected Topics in Signal Processing, vol. 7, No. 6, Dec. 2013, 9 pages.
Skupin et al., "Tile Based HEVC Video for Head Mounted Displays", Institute for Electrical and Electronics Engineers (IEEE), 2016 IEEE International Symposium on Multimedia, San José, California, USA, Dec. 11, 2016, 2 pages.
Fleureau et al., "Description of Technicolor Intel response to MPEG-I 3DoF+ Call for Proposal", International Organisation for Standardisation, ISO/IEC JTC1/SC29/WG11, Coding of Moving Pictures and Audio, Document: MPEG2019/m47445, Geneva, Switzerland, Mar. 2019, 24 pages.
Anonymous, "Information Technology—Coding of Audio-Visual Objects—Part 10: Advanced Video Coding", International Standard, ISO/IEC 14496-10, Second Edition, Oct. 1, 2004, 280 pages.
ITU, "Information Technology—Digital Compression and Coding of Continuous—Tone Still Images—Requirements and Guidelines", Terminal Equipment and Protocols for Telematic Services, The International Telegraph and Telephone Consultative Committee (CCITT), T.81, Sep. 1992, 186 pages.
ITU_T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, pp. 1-680.
ITU-T, "High Efficiency Video Coding", H.265, Telecommunications Standardization Sector of ITU, Series H: Audiovisual and Multimedia Systems, Infrastructure of Audiovisual Services—Coding of Moving Video, Oct. 2014, 540 pages.
ITU-T, "High Efficiency Video Coding", Recommendation ITU-T H.265, Series H: Audiovisual and Multimedia Systems, Infrastructure of Audiovisual Services—Coding of Moving Video, Feb. 2018, 692 pages.

* cited by examiner

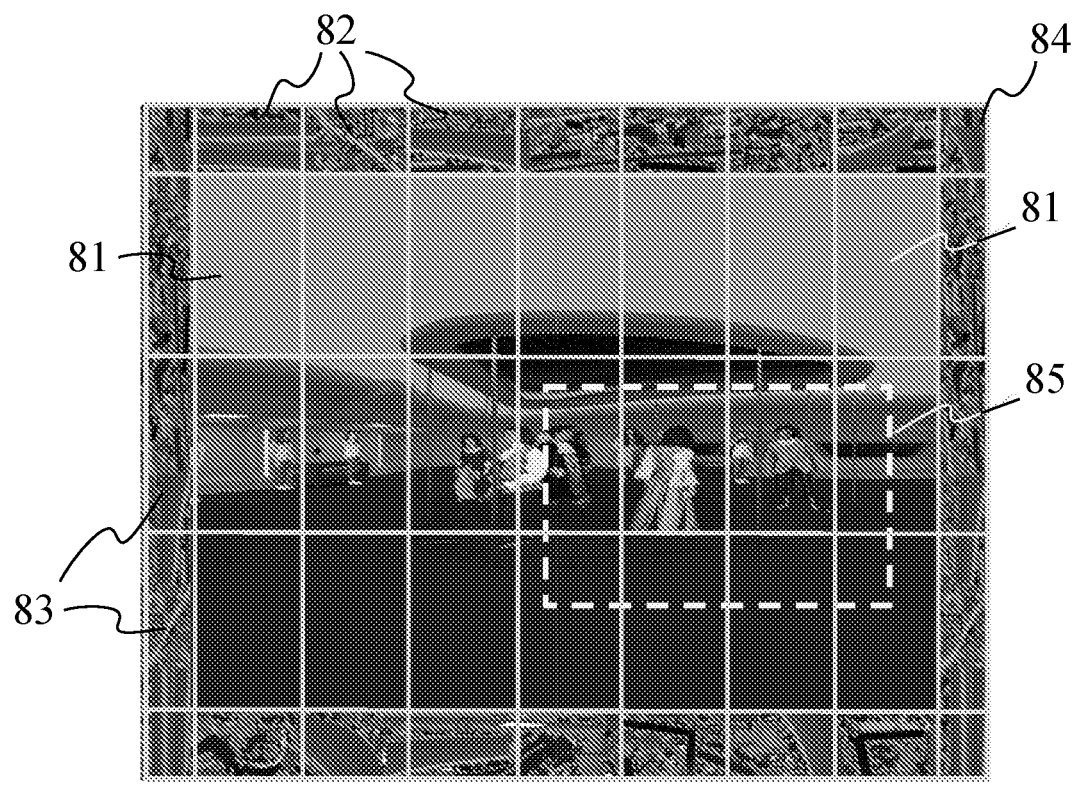
Figure 8
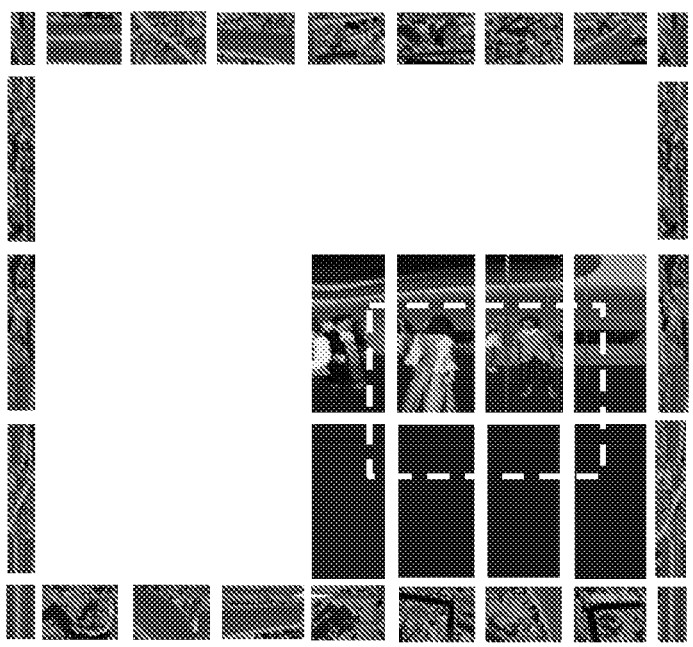 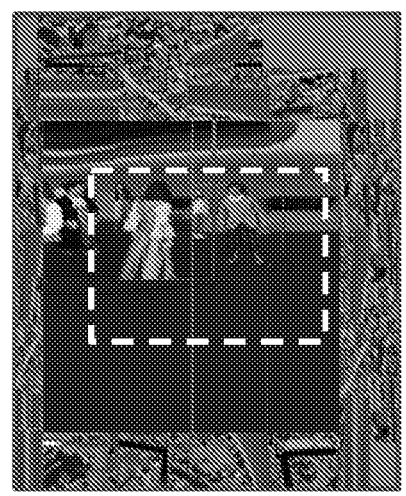
Figure 9A         Figure 9B

METHOD AND APPARATUSES FOR DELIVERING A VOLUMETRIC VIDEO CONTENT

CROSS REFERENCE TO RELATED APPLICATIONS

This application is a U.S. National Stage Application under 35 U.S.C. 371 of International Patent Application No. PCT/US2020/049022, filed Sep. 2, 2020, which is incorporated herein by reference in its entirety.

This application claims the benefit of European Patent Application No. 19306090, filed Sep. 10, 2019, which is incorporated herein by reference in its entirety.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD). In particular, the present principles relate to delivering a volumetric video content as a set of tiles selected according to a viewport size and location.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

A volumetric video requires a large amount of data to be encoded. In a streaming context and as the viewer does not look at the entire content, a tiling approach may be used to transmit and decode only the part of the content the user is actually looking at. A solution for viewport-adaptive streaming of patch-based 3DoF+ content based on HEVC tiling consists in transmitting three streams:

a 360° (3DoF) video stream carrying a texture (i.e. color) central viewpoint;
a second video stream carrying a depth patch atlas describing the 3D scene geometry of the central viewpoint and dis-occluded parts; and
a third video stream carrying a texture patch atlas describing the dis-occluded parts A standardized HEVC tiling is applied to the first video stream, while a finer tiling grid is used for the two patch atlases. At the encoding side, the generated depth and texture patches are organized in clusters corresponding to the tiles of the central video, each cluster being distributed into several patch tiles. The patch atlas tiles are dynamically allocated to the different patch clusters, and a linking between each tile of the central viewpoint video and the additional list of patch tiles required for motion parallax in that given viewing angular sector is memorized. The viewport-adaptive streaming of 3DoF+ content is thus enabled, with only the required texture and geometry data transmitted and decoded at a given instant.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method comprising:

determining a size and a location of a viewport for a displaying of a part of a 3D scene;

obtaining a set of tile images according to the viewport information. The set comprises a first list of central tiles and a second list of border tiles. A central tile is a part of an image obtained by projecting the 3D scene onto an image plane according to a central point of view. A border tile is an image comprising pictures representative of a projection of a part of the 3D scene onto a picture plane according to a point of view different from the central point of view, generally called patches. A border tile comprises projections of points not visible from the central point of view. Every central tile has a same size and a border tile has the width and/or the height of a central tile; and generating an atlas image comprising the set of tile images arranged according to a layout selected in a set of layouts. The layout is selected according to the number of obtained central and border tiles and to the size of border tiles.

The present principles also relate to a device implementing this method and to a stream generated by this method and encoding a 3D scene.

The present principles also relate to a method comprising:

obtaining a size and a location of a viewport for a displaying of a part of a 3D scene;

selecting a first list of central tiles according to this viewport information. A central tile is a part of an image obtained by projecting the 3D scene onto an image plane according to a central point of view and called central image;

selecting a second list of border tiles according to the viewport information. A border tile is an image comprising pictures representative of a projection of a part of the 3D scene onto a picture plane according to a point of view different from the central point of view, also called a patch; So, a border tile comprises projections of points not visible from the central point of view;

Every central tile has a same size and, a border tile has the width and/or the height of a central tile;

transmitting a set of tile images comprising the first and the second lists.

The present principles also relate to a device implementing this method and to a stream generated by this method and encoding a 3D scene.

4. BRIEF DESCRIPTION OF DRAWINGS

The present disclosure will be better understood, and other specific features and advantages will emerge upon reading the following description, the description making reference to the annexed drawings wherein:

FIG. 8 illustrates, at the server side, the result of an example tiling of an atlas with a layout corresponding to FIGS. 6 and 7 according to the present principles;

FIG. 9A and 9B illustrate tiles selected according to the first embodiment described in relation to FIG. 8 according to a non-limiting embodiment of the present principles;

5. DETAILED DESCRIPTION OF EMBODIMENTS

Figure 1:
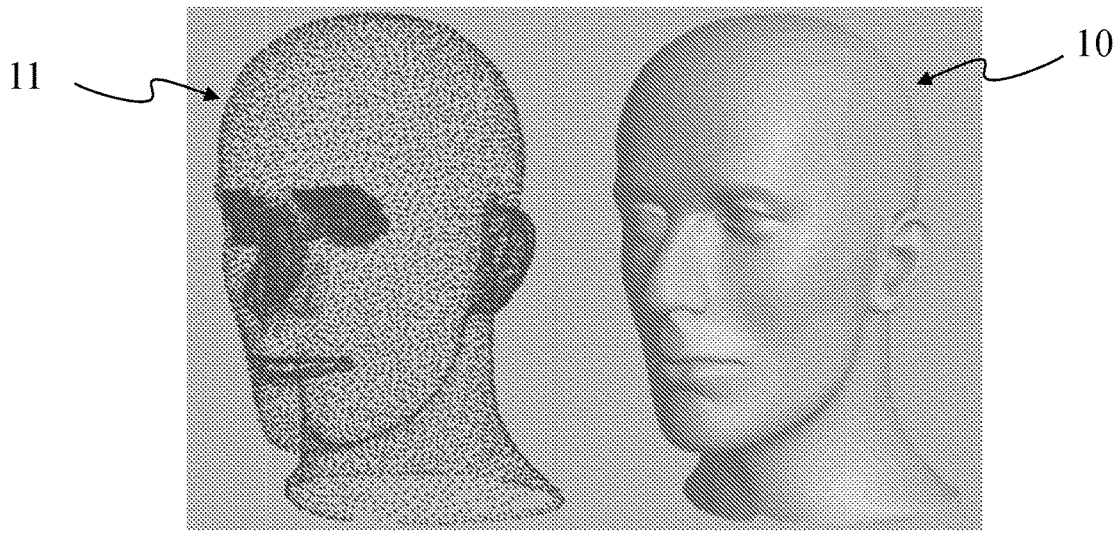
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:
  from a capture of a real object shot by a rig of cameras, optionally complemented by depth active sensing device;
  from a capture of a virtual/synthetic object shot by a rig of virtual cameras in a modelling tool;
  from a mix of both real and virtual objects.

Figure 2:
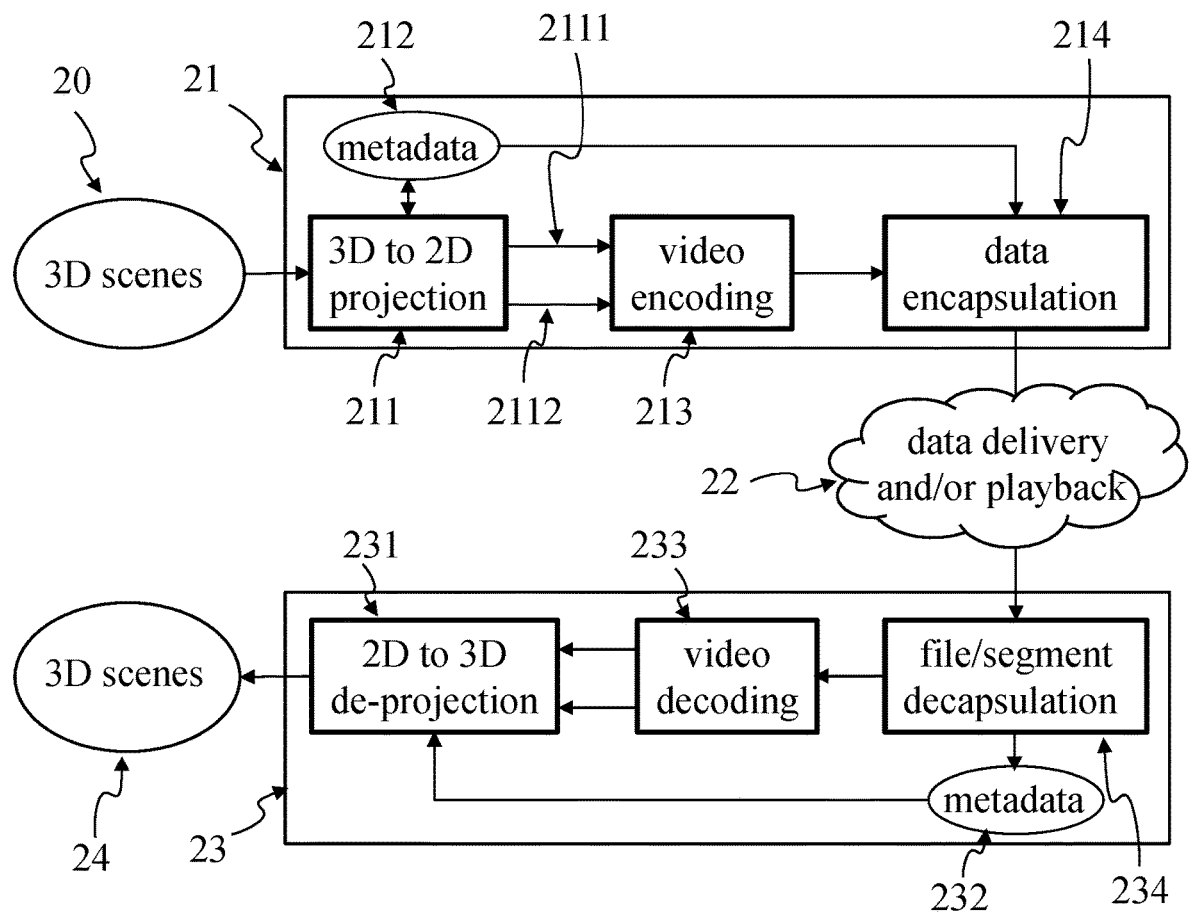
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
  JPEG, specification ISO/CEI 10918-1 UIT-T Recommendation T.81, https://www.itu.int/rec/T-REC-T.81/en;
  AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);

3D-HEVC (an extension of HEVC whose specification is found at the ITU website, T recommendation, H series, h265, http://www.itu.int/rec/T-REC-H.265-201612-I/en annex G and I);

VP9 developed by Google; or

AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

a local memory, e.g. a video memory or a RAM (or Random-Access Memory), a flash memory, a ROM (or Read Only Memory), a hard disk;

a storage interface, e.g. an interface with a mass storage, a RAM, a flash memory, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Video rendering device 23 displays a part of the received 3D scene in its viewport according to a view point determined by a controller, for example the Inertial Measurement Unit (IMU) of a HMD or a joystick associated with a TV screen. So, video rendering device 23 may send a viewport data representative of this point of view to a data delivery device. This viewport data is, so, also representative of a part of the volumetric image needed to decode the part of the 3D scene to be displayed in the viewport. Viewport data may comprise information about the size of the viewport and its location within the volumetric video content. Circuit 214 of the data delivery device (e.g. encoder 21 or a video server) may use the received viewport data to encapsulate only the needed part of the volumetric image for the viewport.

Figure 3:
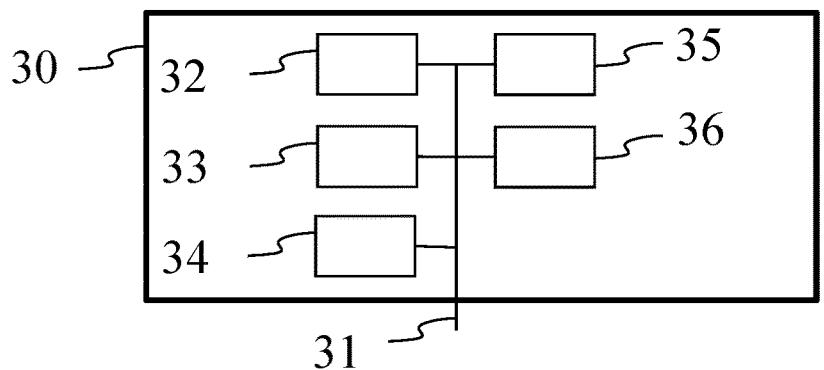
FIG. 3 shows an example architecture of a device which may be configured to implement a method described in relation with FIGS. 10 and 11, according to a non-limiting embodiment of the present principles.
Figure 10:
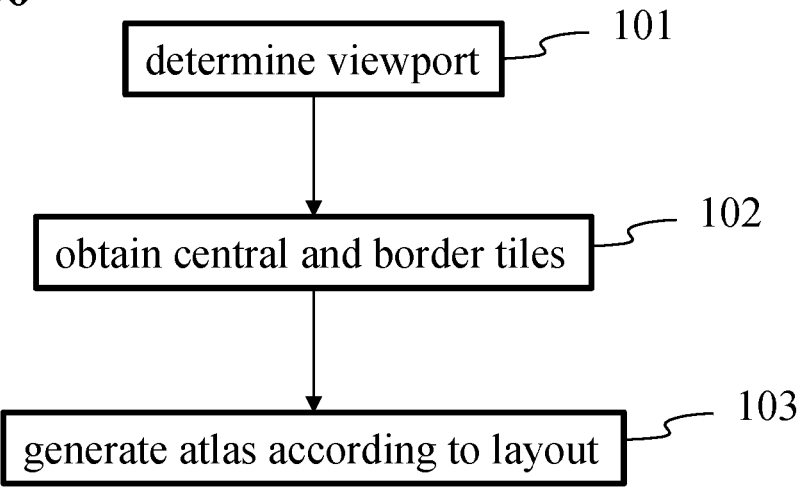
FIG. 10 illustrates a method for generating an atlas from central and border tiles according to a non-limiting embodiment of the present principles.
Figure 11:
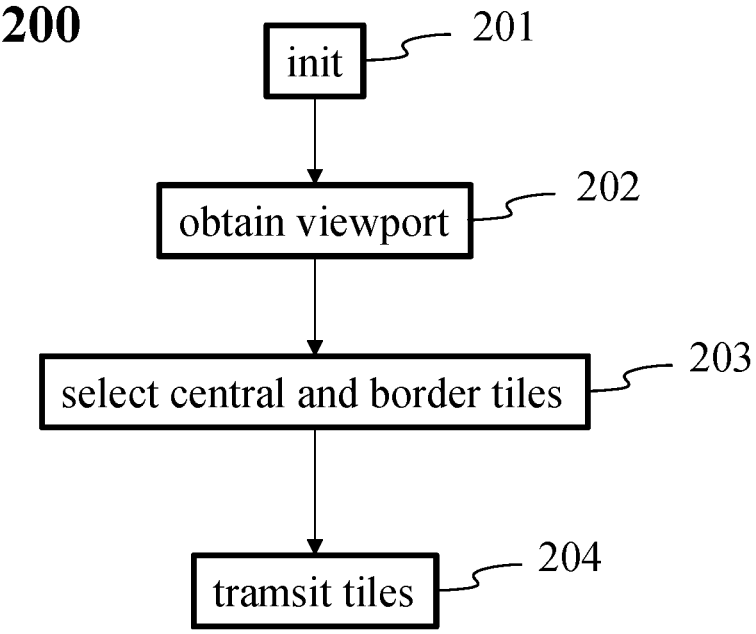
FIG. 11 illustrates a method for transmitting a set of tile images comprising central and border tiles as a function of a size and location of a viewport according to a non-limiting embodiment of the present principles.

FIG. 3 shows an example architecture of a device 30 which may be configured to implement a method described in relation with FIGS. 10 and 11. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:

a microprocessor 32 (or CPU), which is, for example, a DSP (or Digital Signal Processor);

a ROM (or Read Only Memory) 33;

a RAM (or Random Access Memory) 34;

a storage interface 35;

an I/O interface 36 for reception of data to transmit, from an application; and a power supply, e.g. a battery.

In accordance with an example, the power supply is external to the device. In each of mentioned memory, the word « register » used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 10 and 11, and belongs to a set comprising:

a mobile device;

a communication device;

a game device;

a tablet (or tablet computer);

a laptop;

a still picture camera;

a video camera;

an encoding chip;

a server (e.g. a broadcast server, a video-on-demand server or a web server).

Figure 4:
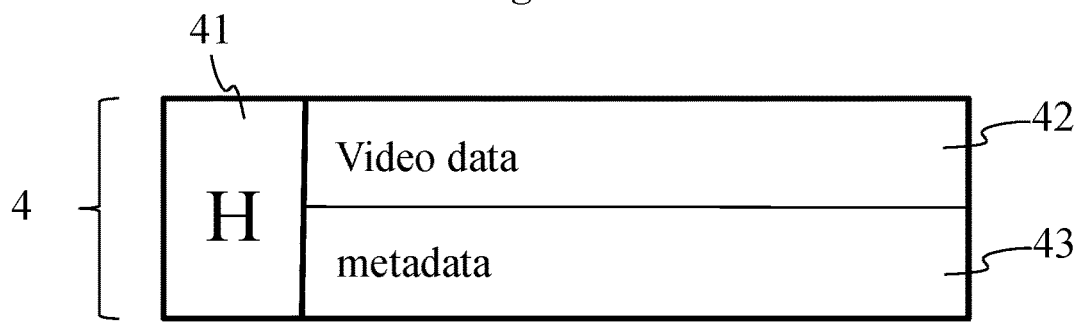
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
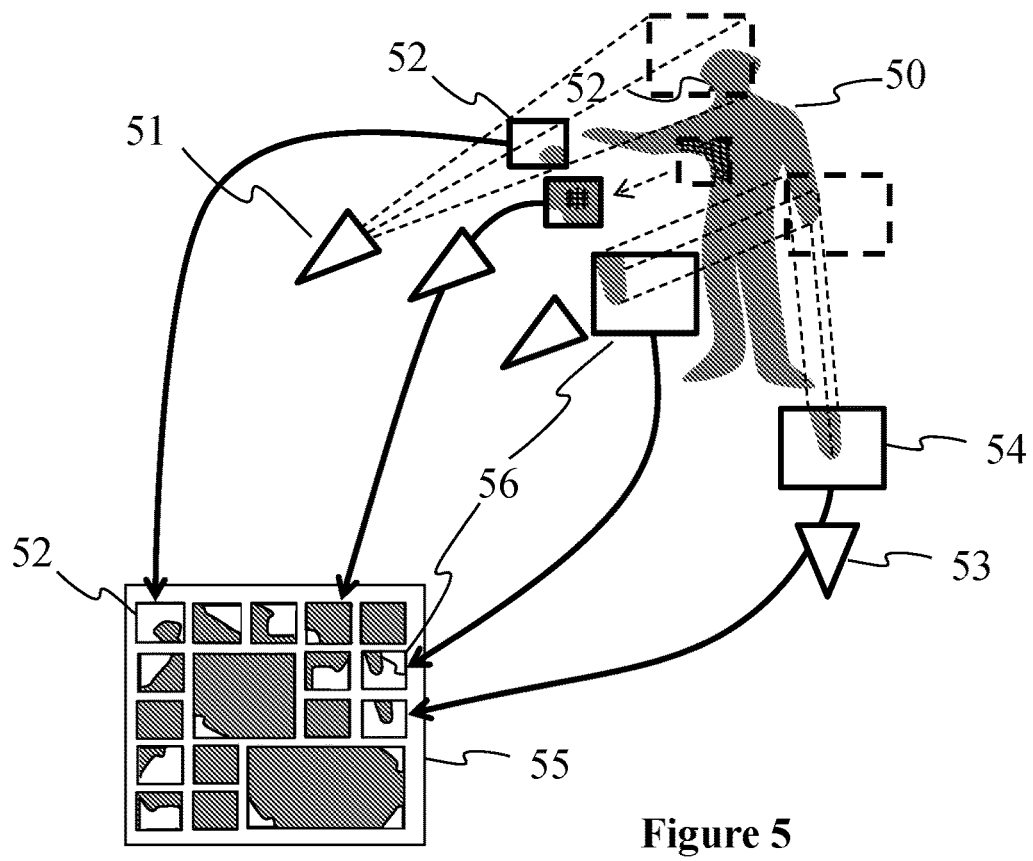
FIG. 5 illustrates the patch atlas approach with an example of 4 projection centers, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
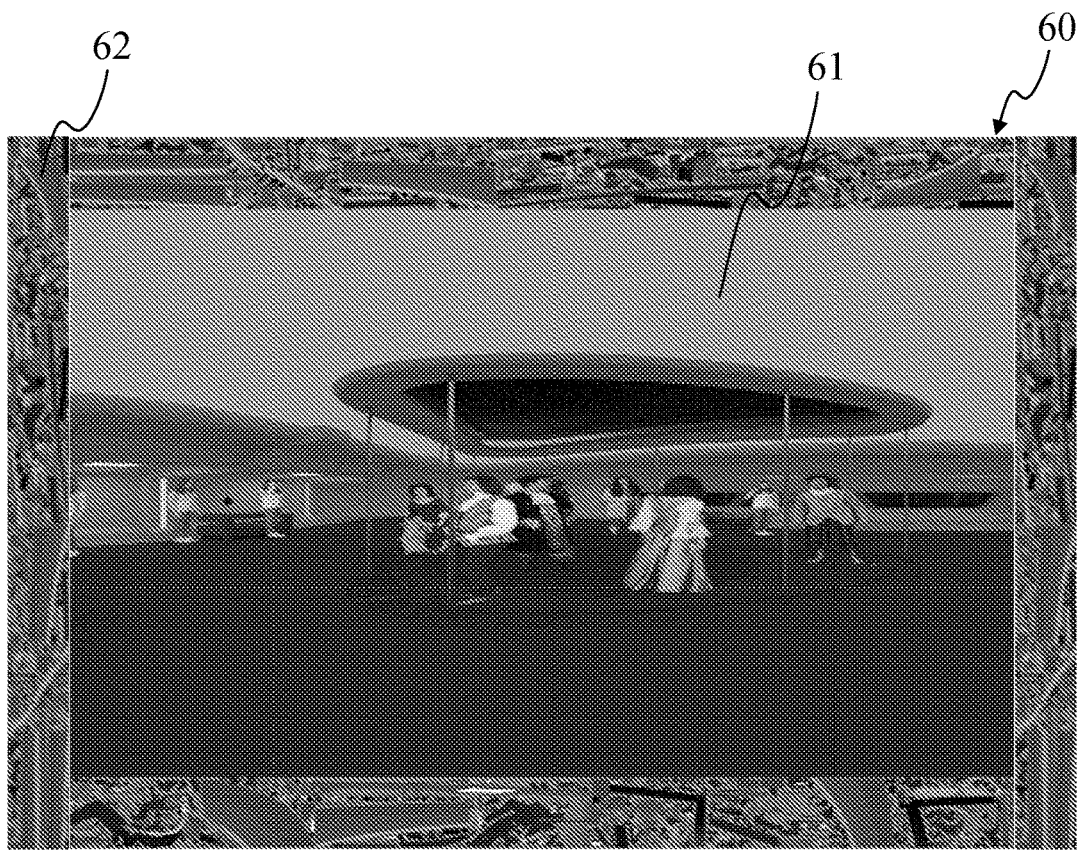
FIG. 6 shows an example of an atlas comprising the texture information of the points of a 3D scene, according to a non-limiting embodiment of the present principles.

FIG. 6 shows an example of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a first part 61, also called central texture image, comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 7:
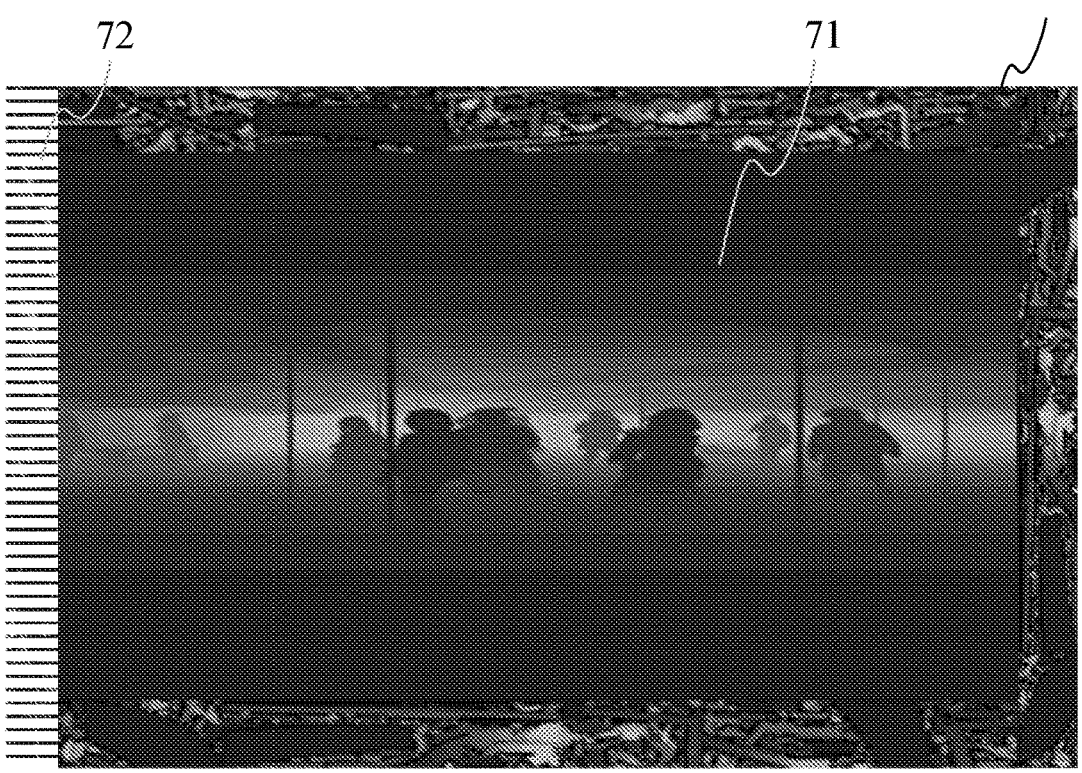
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6. In the example of FIG. 7, the closer a point from the center of projection, the darker the pixel of its projection.

Atlas 70 comprises a first part 71, also called central depth image, comprising the depth information of the points of the 3D scene that are visible from the central point of view and one or more second parts 72. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

FIG. 8 illustrates, at the server side, the result of an example tiling of an atlas with a layout corresponding to FIGS. 6 and 7 according to the present principles. The server/encoder obtains an image corresponding to an atlas according to the example of FIGS. 6 and 7. According to the present principles, the central image (texture and depth) is split into a set of central tiles 81. In an embodiment, the central image is divided following a regular rectangular grid, and every central tile 81 has the same size (width and height). In this embodiment, the sever/encoder receives an atlas comprising dis-occluding patches, for instance, at the periphery or the borders of the central image as illustrated in FIGS. 6 and 7. In an embodiment, the dis-occluding patches are gathered within border tiles 82 or 83. For example, border tiles are horizontal border tiles 82 and/or vertical border tiles 83. Horizontal border tiles have the width of central tiles and vertical border tiles have the height of central tiles. In another embodiment, corners are used to create corner border tiles 84, having the height of horizontal border tiles and the width of vertical border tiles. An advantage of building tiles of a given size is to make them adapted to be fitted in pre-determined reconstructing layouts as illustrated in relation to FIG. 9B. Another advantage to prepare tiles according to embodiments illustrated in relation to FIG. 8 is that they are built on the basis of an atlas generated in a legacy 3DoF+ framework (compatible with 3DoF rendering). In FIG. 8, dashed rectangle 85 represents a rendering viewport frame obtained, for example, from a decoder-client and applied to the central image. Central tiles overlaid by the viewport frame 85 have to be transmitted to the decoder clients. Other central tiles are not transmitted according to the principle of delivering by tiles. Border tiles comprise patches, that is projection of parts of the 3D scene necessary for filing dis-occluded parts of the central view.

In a first embodiment, a predetermined set of border tiles, for instance every border tile, is delivered with the central tiles corresponding to the viewport. In another embodiment, a given set of border tiles, for example prepared to gather dis-occluding data for a first level of rendering are systematically associated with central tiles selected in a first list. In such an embodiment, the decoder receives every patch and, so, dis-occluding data are necessarily obtained.

In a second embodiment, central tiles are associated with a subset of border tiles. Border tiles associated with a given central tile comprise patches comprising dis-occluding data potentially required for filing holes from the point of view corresponding to the viewport. This embodiment requires an organisation of patches in border tiles so a central tile is associated with a limited number of border tiles. When a request comprising viewport data is received from a client, central tiles corresponding to viewport data are selected and only border tiles associated with these selected central tiles are encoded in the data stream. In this embodiment, only a subset of the border tiles is encoded in the data stream and transmitted while every needed data to reconstruct the 3D scene from the point of view corresponding to the viewport are obtained by the decoder.

In a third embodiment, central tiles are associated with a subset of border tiles according to the same principles and an importance score is attributed to each border tile. When a request is received from a client, central tiles corresponding to the received viewport data are encoded in the data stream and only a given number of border tiles associated with selected central tiles are encoded in the data stream. The selected border tiles are the ones with the higher important score for example. In this embodiment, for a given viewpoint at the decoder side, there is no guarantee that every required information to reconstruct the dis-occluded parts is available. However, the size of the delivered content is known a priori by the decoder and the layout to be used is pre-determined. In a variant, in particular if vertical and horizontal border tiles do not have a same size (after a rotation), a given number of each type of border tiles may be selected in order to fit the pre-determined layout as illustrated in relation with FIGS. 9A and 9B.

FIG. 9A illustrates tiles selected according to the first embodiment described in relation to FIG. 8. Central tiles corresponding to the current point of view of the renderer (and described in the viewport data) have been selected, encoded, delivered and decoded. In the first embodiment, every border tiles are selected, encoded, delivered and decoded. Thus, the number, shape and size of tiles is known a priori by the decoder. A 3DoF+ decoder is expecting an atlas and not a set of tiles. So, an atlas has to be reconstruct from the obtained set of tiles as illustrated in FIG. 9B. In this embodiment, the disocclusion patches are packed within the border tiles, without care of the central tile they are associated with, with packing efficiency as the only criterium. This solution requires that all border tiles are available at decoding side, whatever the viewport. As illustrated in 9A, all border tiles are delivered to the decoder, whatever the viewport. In the example of FIG. 8, border tiles are aligned with center tiles, so, it is always possible to recombine all tile tracks into a single HEVC compliant bitstream of fixed frame size. Such aggregation is either performed with extractor tracks ("early binding") or by bitstream rewriting at client side ("late binding") and allows to feed a single video decoder with an HEVC compliant bitstream. An alternative with two decoders is to recombine all border tiles in a separate bitstream.

According to the second embodiment, each central tile (or subset of central tiles) is mapped with a border tile (or a subset of border tiles). This requires that disocclusion patches are first clustered into patch sets associated with central tiles, and then packed within their pre-defined border tiles. Only the border tiles mapped with a selected central tile are transmitted for a given viewport. The tile correspondence is fixed, and thus does not need to be transmitted to the decoder. This second embodiment is less efficient in terms of packing than the first embodiment, but more efficient in terms of bitrate. For example, each of the central tile of the 7*3 central tiles of FIG. 8 is associated with one of the 24 border tiles of the FIG. 8. For instance, tiles of the upper row are associated with one border tile of the upper strip; tiles of the lower row are mapped with one border tile of the lower strip; and tiles of the middle row are associated with one border tile of the left or right strip. Such a mapping allows to recombine in a single bitstream of fixed frame size the, for instance, 8 central tiles covering the viewport to render, together with the 8 associated border tiles according to a given layout that maximize the use of the pixels of the fixed-size frame.

In the third embodiment, the border tile(s) associated with each central tile is(are) not determined a priori but is(are) content dependent and depends on the analysis of the set of dis-occlusion patches to pack for a given atlas. The patches are, for instance, sorted by decreasing visual importance and packed one after the other, beginning with the most important one; they are still assigned to distinct border tiles depending on the central tile they are associated with, but a varying number of border tiles is attached to a central tile, depending on the number of disocclusion patches to pack. The process stops either when all patches are packed, or when the maximum number of available border tiles are used.

For a given viewport position, there is now no guarantee that all border tiles can be recombined within a fixed size frame. For instance, in the example of FIG. 8 (right part), there may be more than 8 border tiles associated with the 8 central tiles. To solve that, all the possible combinations of tiles needed to cover all viewport positions are examined one after the other (14 combinations for the example of FIG. 8): for each combination, the border tiles are sorted according to a visual importance criterion (deduced from the visual importance of packed patches within, for example their average value) and the less important border tiles are discarded if needed.

The above described mapping is an educational example. Depending on the parameters of the tile-based viewport dependent streaming scheme—number of rows and columns of the grid, spatial coverage of the viewport—and the decoder frame size, several tile mapping variants can be defined.

In every embodiment above, when a tile is encoded in the data stream, associated metadata are also encoded in the data stream.

FIG. 10 illustrates a method 100 for generating an atlas from central and border tiles according to a non-limiting embodiment of the present principles. At a step 101, a size and a location of a viewport for a displaying of in a 3D scene is determined. The viewport is a window in the 3D space around the viewer. The view port is determined, for example, according to the pose (i.e. location and orientation) of a Head-Mounted Display (HMD) device wore by the user. This pose information is transmitted to a circuit which may be local or remote. As illustrated in the method of FIG. 11, the circuit selects a set of tile images and transmit them to the circuit implemented the present method. At a step 102, this set of tile images is obtained. The set comprises two lists of tiles of different natures. A first list comprises central tiles. A central tile is a part of an image obtained by projecting the 3D scene onto an image plane according to a central point of view as depicted in FIGS. 8, 9A and 9B. Every central tile has a same size. A second list comprises border tiles. A border tile is an image comprising pictures representative of a projection of a part of the 3D scene onto a picture plane as depicted in FIGS. 8, 9A and 9B. A border tile has the width and/or the height of a central tile. A border tile having the width of a central tile is called a horizontal border tile; A border tile having the height of a central tile is called a vertical border tile; A third category of border tiles may be identified: those having the width of a vertical horizontal tile and the height of a horizontal border tile are called corner border tiles. These different sizes and shapes of border tiles are illustrated in FIG. 8. At a step 103, a layout is selected in a set of predetermined layouts. A layout is an organization to arrange a given number of central and border tiles of known sizes and shapes in an atlas image as depicted in relation to FIGS. 5 to 8. Examples of layouts are provided in FIGS. 9A and 9B. The size and the shape of border tiles is predetermined and known a priori. As the size and the shape of the border tiles is a function of the size and the shape of central tiles, the selecting of the most efficient layout to generate the atlas image is a function of the number of central and border tiles in the set obtained at step 102 and of the size and shapes of the border tiles in the second list. The atlas image has a predetermined size and the selection of the layout makes obtained tiles fit in the frame of the atlas image. Metadata related to patches comprised in border tiles are associated with the atlas image modulo the translations operated by the layout. In an embodiment, the number, size and shapes of the border tiles comprised in the second list is predetermined. Then, the selected layout is only function of the number of central tiles. In another embodiment, the number of border tiles varies according to the viewport determined at step 101. In this embodiment the set of layouts comprises different possibilities to arrange the obtained set of tiles. In a variant, the border tiles of the second list are associated with a value representative of an importance score corresponding to the use of the patches for filling dis-occluded areas according to the pose determined at step 101. If no layout allows the arrangement of every border tile of the second list of the obtained set, the selecting of the layout is a function of the importance score, the size and the shape of the border tiles. The selected layout is the one that maximize the arrangement of important border tiles in the generated atlas image.

FIG. 11 illustrates a method 200 for transmitting a set of tile images comprising central and border tiles as a function of a size and location of a viewport according to a non-limiting embodiment of the present principles. At a step 201, a central image divided in central tiles and a set of patches arranged in border tiles is obtained. As illustrated in FIG. 8, the central image is obtained by projecting the 3D scene onto an image plane according to a central point of view. A central tile is a part of the central image. Every central tile has a same size. A border tile is an image comprising patches, that are pictures representative of a projection of a part of the 3D scene onto a picture plane. A border tile has the width and/or the height of a central tile. A border tile having the width of a central tile is called a horizontal border tile; A border tile having the height of a central tile is called a vertical border tile; A third category of border tiles may be identified: those having the width of a vertical horizontal tile and the height of a horizontal border tile are called corner border tiles. These different sizes and shapes of border tiles are illustrated in FIG. 8. At a step 202, viewport information is received from a client circuit. The client circuit may be local or remote. The viewport information corresponds to a pose (i.e. location and orientation in the 3D space of the 3D scene) of a virtual camera used for rendering and displaying the view of a user in the 3D scene. At a step 203, a first list of central tiles is selected as a function of this viewport information. Selected central tiles are the one which comprise color and depth information necessary for rendering the 3D scene for the pose of the virtual camera. As the location of the virtual camera may differ from the central projection point used to obtain the central image, some patches have to be selected to in order to fill the dis-occluded regions at the rendering of the 3D scene. In an embodiment, the second list of border tiles is predetermined. For instance, every border tiles may be selected. In another embodiment, central tiles are associated with a subset of border tiles which comprise patches required for filling dis-occluded regions for the different viewports which lead to the selection of this central tile in the first list. In this embodiment, the second list comprises the border tiles associated with the central tiles selected in the first list. Thus, the number, size and shape of the border tiles in the second list transitively depends on the viewport information. In another embodiment, a value representative of an importance score is attributed to every association between central and border tiles. A score may be attributed to selected border tiles as a function (e.g. the max) of the importance score for the different selections of this border tiles (indeed, a same border tile may be associated with several central tiles). In a variant, border tiles of the second list are selected as a function of their size and shape and the importance score of their different associations. In this variant, only the important border tiles (for example in number, size and shape to fit a given layout) are selected and transmitted. At a step 204, the first and second lists are gathered in a set of tiles, in association with metadata required for de-projecting the different tiles and transmitted to the client circuit which provided the viewport information at step 202.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
    obtaining an image by projecting a 3D scene according to a central point of view onto an image plane, the image being divided into first tiles having a same size;
    obtaining second tiles, wherein a second tile is an image comprising patch pictures representative of a projection of a part of the 3D scene onto a picture plane according to a point of view different from the central point of view, a second tile having a same width and/or a same height as a first tile, wherein each first tile is associated with a collection of second tiles and wherein an association between a first tile and a second tile has a score;
    identifying a viewport for displaying of a part of the 3D scene;
    selecting a subset of first tiles according to the viewport;
    selecting a set of second tiles comprising second tiles associated with first tiles of the subset of first tiles, the set of second tiles being selected as a function of a size of second tiles associated with first tiles of the subset and of the score of the associations; and
    encoding an atlas image comprising the subset of first tiles and the set of second tiles arranged according to a layout selected in a set of layouts, the layout being selected according to a number of first tiles in the subset of first tiles and a number of second tiles in the set of second tiles and to a size of the second tiles in the set of second tiles.

2. The method of claim 1, wherein the second tiles are horizontal tiles having a width of the first tiles, vertical tiles having a height of the first tiles, or corner tiles having a same width and a same height as the first tiles.

3. The method of claim 1, wherein the number and the size of the second tiles in the set of second tiles are predetermined.

4. The method of claim 1, wherein the second tiles are associated with metadata, the metadata being used to select the layout of the atlas image.

5. The method of claim 1, wherein the viewport is obtained from a remote device and wherein the subset of first tiles and the set of second tiles are transmitted to the remote device.

6. The method of claim 1, wherein the viewport is obtained from a remote device and wherein the atlas image is transmitted to the remote device.

7. A non-transitory computer readable medium storing instructions which, when executed by one or more processors, cause the one or more processors to perform the method of claim 1.

8. An apparatus comprising a memory associated with a processor configured to:
   obtain an image by projecting a 3D scene according to a central point of view onto an image plane, the image being divided into first tiles having a same size;
   obtain second tiles, wherein a second tile is an image comprising patch pictures representative of a projection of a part of the 3D scene onto a picture plane according to a point of view different from the central point of view, a second tile having a same width and/or a same height as a first tile, wherein each first tile is associated with a collection of second tiles and wherein an association between a first tile and a second tile has a score;
   identify a viewport for displaying of a part of the 3D scene;
   select a subset of first tiles according to the viewport;
   select a set of second tiles comprising second tiles associated with first tiles of the subset of first tiles, the set of second tiles being selected as a function of a size of second tiles associated with first tiles of the subset and of the score of the associations; and
   encode an atlas image comprising the subset of first tiles and the set of second tiles arranged according to a layout selected in a set of layouts, the layout being selected according to a number of first tiles in the subset of first tiles and a number of second tiles in the set of second tiles and to a size of the second tiles in the set of second tiles.

9. The apparatus of claim 8, wherein the second tiles are horizontal tiles having a width of the first tiles, vertical tiles having a height of the first tiles, or corner tiles having a same width and a same height as the first tiles.

10. The apparatus of claim 8, wherein the number and the size of the second tiles in the set of second tiles are predetermined.

11. The apparatus of claim 8, wherein the second tiles are associated with metadata, the metadata being used to select the layout of the atlas image.

12. The apparatus of claim 8, wherein the viewport is obtained from a remote device and wherein the subset of first tiles and the set of second tiles are transmitted to the remote device.

13. The apparatus of claim 8, wherein the viewport is obtained from a remote device and wherein the atlas image is transmitted to the remote device.

* * * * *